April 3, 1951 W. R. DU BOIS 2,547,076
SAFETY LATCH AND SWITCH
Filed Jan. 25, 1946 2 Sheets-Sheet 1

INVENTOR
William R. DuBois
BY
C. D. Tuska
ATTORNEY

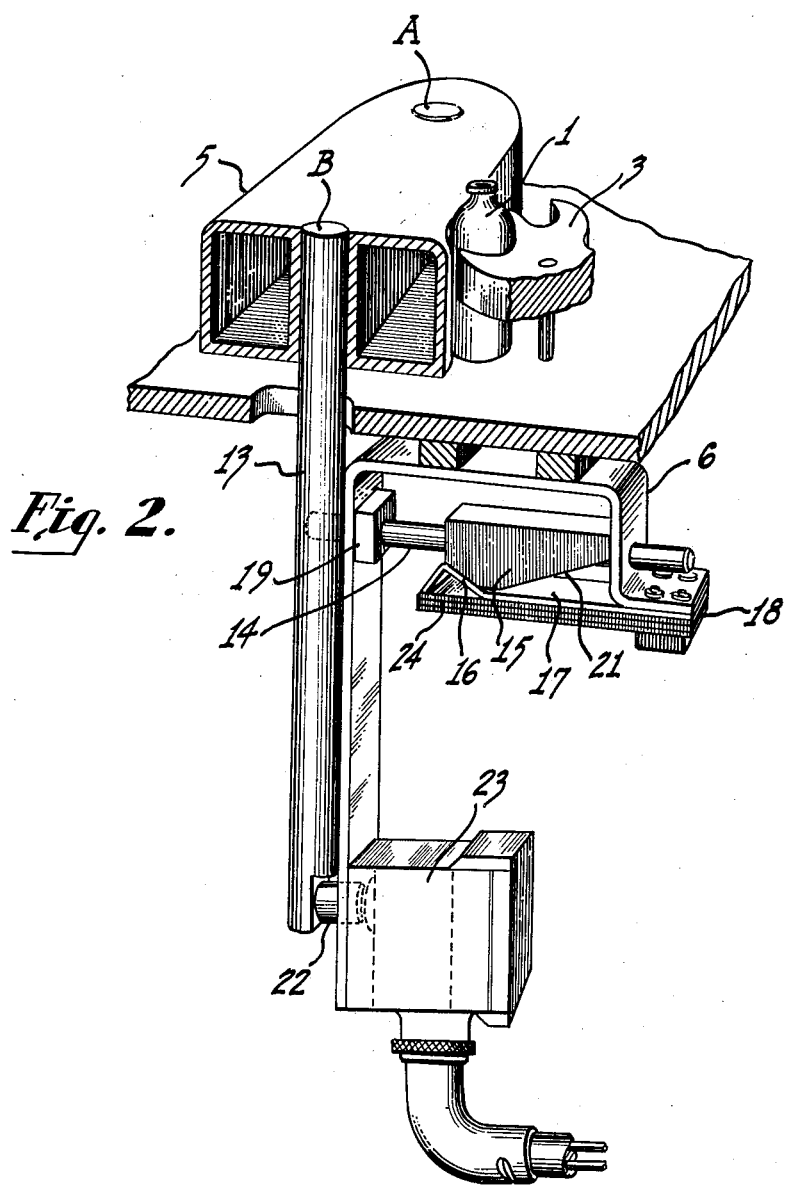

Patented Apr. 3, 1951

2,547,076

UNITED STATES PATENT OFFICE 2,547,076

SAFETY LATCH AND SWITCH

William R. Du Bois, Indianapolis, Ind., assignor to Radio Corporation of America, a corporation of Delaware Application January 25, 1946, Serial No. 643,433

11 Claims. (Cl. 198—232)

This invention relates to safety devices which may be used in package handling apparatus especially in bottling machines and beverage inspection machines.

More particularly it relates to a safety device useful in bottle handling machines having a conveyor and indexing starwheel arrangement such as shown in Young Patent 2,270,613 although it is obviously applicable to any type of package handling apparatus of the general type illustrated wherein articles may become jammed at certain critical points in the conveying system or transfer mechanism.

As shown in a large number of patents in the prior art it has heretofore been conventional practice to provide for bottles jamming at the infeed or outfeed gates between starwheel and conveyor by having a part of the bottle guide at these critical points movable but held in normal position with a tensioning spring. Thus when two or more bottles become jammed at one of these points such as between the infeed starwheel and its bottle guide the movable segment of the guide opened against the tensioning force of the spring. However, in this arrangement the spring tension pressed the jammed bottles so tightly against the starwheel shaft that it often happened that either the bottles were broken or the starwheel shaft became warped and twisted.

The device embodied in the present invention prevents such harmful force from being exerted on the starwheel. The movable guide segment is still held in its normal position by a predetermined spring tension but when bottles become jammed, means are provided for relieving the pressure on the starwheel before it has reached a harmful value.

One object of the present invention is to provide a safety device which may be employed for preventing injury to the starwheel of a package handling machine when packages become jammed in said wheel.

Another object of the invention is to provide a device which may be employed for relieving abnormal pressure on the guide structures at any designated point in an article handling machine.

Another object of the invention is to provide means for automatically stopping motion in a bottling or beverage inspection machine when abnormal pressure is exerted at certain designated points.

Fig. 2 is a diagrammatic view of the safety latch and a microswitch useful in conjunction therewith as well as being a view partly in section showing the position of the latch mounting with respect to a bottle guide and starwheel infeed device.

For purposes of illustration the invention will be described in connection with a bottle handling machine.

Figure 1:
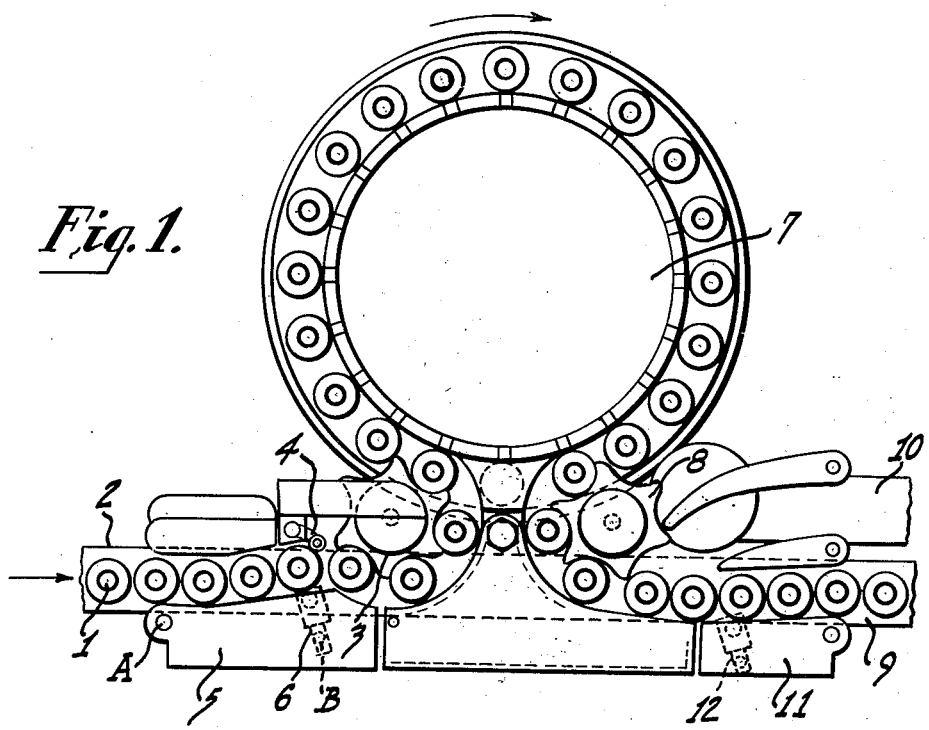
Fig. 1 is a top view diagrammatically representing how the device is used in relation to the remaining parts of one type of bottle handling apparatus.

As shown in Fig. 1, bottles 1 are carried in the direction of the arrow along infeed conveyor 2 to an infeed starwheel 3. The bottles may be unevenly and erratically spaced on the conveyor and to allow each bottle to enter the rotating starwheel at the proper instant when a compartment is properly positioned to receive it, the bottles are passed through an infeed device which includes a swinging gate 4, and a vertical walled guide segment 5 held in normal position by a latch 6 (see Fig. 2). As also shown in Fig. 1 this guide segment also extends part way around the periphery of the starwheel 3. The bottles then are fed from the starwheel to a revolving turret 7 where they may be subjected to a particular process step such as filling or mixing or inspecting or the like.

The bottles continue on around the turret 7 in the direction shown by the arrow and enter outfeed starwheel 8. If the bottles have been subjected to an inspecting operation while travelling on the turret, from this starwheel the bottles may be directed to either of two conveyors. Those having passed the inspection are delivered to conveyor 9 while those rejected are directed to conveyor 10. The mechanism for accomplishing this sorting process is more fully shown and claimed in Patent No. 2,393,188 of James H. Reynolds, and forms no part of the instant invention.

At the entrance to outfeed conveyor 9 there is shown another movable bottle guide 11 held in normal position by a spring latch arrangement 12 similar to 6 as shown in Fig. 2.

Although only two such movable bottle guide segments, held in position by the spring latches of the instant invention, are shown, they may be placed at any point where jamming is likely to occur.

The actual operation of the device is as follows: Under normal operating conditions, bottle guide segment 5 is in the position shown in Fig. 1.

Figure 3:
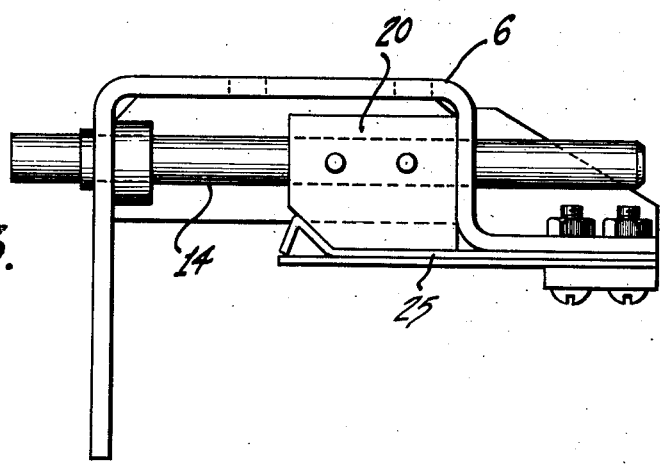
Fig. 3 shows a modified form of leaf spring and cam which may be used with the latch.

This segment is pivoted at point A and attached at B to vertical rod 13 (Fig. 2) which in turn is rigidly attached to horizontal plunger 14. In normal operation plunger 14 is in the position shown in the figure and is held there by cam or lug 15 which has an inclined surface 16 resting against one leg of the inverted V forming part of leaf 17 of spring 18. The other leaves 24 of spring 18 are straight and provide additional tension. Should an extra bottle become jammed in the starwheel, the guide segment is forced outward against the spring tension until the low point on cam 15 has ridden over the high point on the inverted V of leaf 17. As this point in the movement of the cam is reached all back tension on guide segment 5 is relieved and the guide is free to swing outward until the cam strikes the stop 19. In the form shown in Fig. 2, the inclined surface 21 of cam 15 is pressed by the outer leg of the V after the cam has ridden over the high point and an added impetus is given to the motion of plunger 14. In the modified form of latch shown in Fig. 3, the modified form of cam 20 has its surface so designed that after the point of the cam has ridden over the high point on leaf 25 the plunger moves only because of the force exerted on the outwardly swinging guide.

As also shown in Fig. 2, when plunger 14 is in normal position, the lower end of vertical rod 13 presses against button 22 of a microswitch 23 which is connected to a motor or motors (not shown) driving the various parts of the bottle handling mechanism. The microswitch is set so that the first movement in excess of normal; i. e., after the low point on the cam has ridden over the high point on the V, actuates the switch which cuts off the motor and at the same time may set a braking mechanism.

Although the action of the brake may be very rapid the machine coasts at least one position and it is for this reason that the movable guide segment 5 must move outward far enough to provide space for extra bottles trying to enter the starwheel.

The action of the movable guide segment 11 at the entrance to the outfeed conveyer is exactly similar to that described above. A protective device such as above described may be placed at any point on the conveying system or transfer mechanism where jamming may occur and may be used in connection with a switch for stopping operation of the mechanism.

The safety switch described is reset by clearing the jammed bottles from the machine and closing the bottle guide segment 5 until the cam 15 and spring 17 engage.

I claim as my invention:

1. In a package handling apparatus of the class described, an infeed starwheel adapted to receive packages from an infeed conveyor, a curved guide arranged concentrically with said starwheel, said guide having a pivotally mounted portion adapted to swing outward when packages become jammed between said starwheel and guide, means for holding said pivotally mounted guide portion in normal operating position until a predetermined pressure on said pivotally mounted guide portion has been exceeded and means for assisting said outward movement of said pivotally mounted guide portion in response to a pressure exceeding said predetermined pressure being exerted on said holding means.

2. In the apparatus of claim 1, means operable by said movable guide portion in its outward assisted motion for actuating a current switch.

3. In a package handling apparatus, including an endless conveyor and an edge guide structure associated therewith, at least one movable segment of said guide structure having a pivoted end and another end adapted to move horizontally outward, a plunger having a cam thereon, means for connecting said horizontally movable end of said movable segment to said plunger, a leaf spring having an obstruction formed thereon, said obstruction being positioned so as to normally oppose motion of said cam, and said spring being tensioned such that when a pressure in excess of a predetermined value is applied along the longitudinal axis of said plunger said cam will ride over said obstruction and allow substantially free motion of said plunger and said movable end of said movable guide segment for a predetermined distance.

4. In the apparatus of claim 3, a stop to limit the extent of said free motion of said plunger and said movable segment.

5. In the apparatus of claim 3, means forming a part of said leaf spring to accelerate the movement of said plunger when said cam has ridden over said obstruction.

6. Apparatus according to claim 3, including a switch and means responsive to movement of said plunger during its period of substantially free movement, for actuating said switch.

7. In a package handling apparatus of the class described, a conveying system having an edge guide strcture including a movable segment, spring means for holding said movable segment in normal operating position with predetermined pressure and means responsive to a pressure against said segment which exceeds said predetermined pressure, for substantially completely relieving the holding pressure of said spring means.

8. In a package handling apparatus of the class described, an infeed starwheel adapted to receive articles from an infeed conveyor, a curved guide structure arranged concentrically with said starwheel, said guide having a pivotally mounted segment adapted to swing outwardly when articles become jammed between said starwheel and said segment, spring tensioned means for exerting an opposing force against the outward motion of said segment when the pressure exerted by said articles is below a certain predetermined pressure, said last mentioned means also including means responsive to a pressure exceeding said predetermined pressure, for relieving said opposing force.

9. Apparatus according to claim 8, including means actuated by said pivotally mounted segment, when moving in response to pressure exceeding said predetermined pressure, for actuating a current switch.

10. In an article handling apparatus, a conveyor having an edge guide structure with at least one pivotally mounted segment adapted to swing outwardly with respect to the conveyor when articles become jammed adjacent said segment, spring tensioned means for exerting an opposing force against the outward motion of said segment when the pressure exerted by said articles is below a certain predetermined pressure, said last mentioned means also including means responsive to a pressure exceeding said predetermined pressure, for relieving said opposing force.

11. Apparatus according to claim 10, including a switch and means actuatable by said segment during movement thereof when said predetermined pressure is exceeded, for actuating said switch.

WILLIAM R. DU BOIS.

REFERENCES CITED

The following references are of record in the file of this patent:

UNITED STATES PATENTS

| Number | Name | Date |
|---|---|---|
| 1,069,870 | Gaynor | Aug. 12, 1913 |
| 1,112,155 | Muench | Sept. 29, 1914 |
| 1,358,255 | Seufer et al. | Nov. 9, 1920 |
| 1,604,440 | Wilkinson | Oct. 26, 1926 |
| 1,825,751 | Meyer et al. | Oct. 6, 1931 |
| 1,828,324 | Kruse | Oct. 20, 1931 |
| 1,957,534 | Gladfelter | May 8, 1934 |
| 2,013,144 | Gladfelter | Sept. 3, 1935 |